United States Patent
Chen et al.

(10) Patent No.: US 9,867,012 B2
(45) Date of Patent: Jan. 9, 2018

(54) WHISPERED SPEECH DETECTION

(71) Applicant: DSP Group LTD., Herzeliya (IL)

(72) Inventors: Yaakov Chen, Rishon LeTzion (IL); Doron Koren, Even Yehuda (IL)

(73) Assignee: DSP GROUP LTD., Herzliya (IL)

(*) Notice: Subject to any disclaimer, the term of this patent is extended or adjusted under 35 U.S.C. 154(b) by 0 days.

(21) Appl. No.: 15/170,974

(22) Filed: Jun. 2, 2016

(65) Prior Publication Data
US 2016/0360372 A1    Dec. 8, 2016

Related U.S. Application Data

(60) Provisional application No. 62/170,212, filed on Jun. 3, 2015.

(51) Int. Cl.
*H04W 24/00* (2009.01)
*H04W 4/02* (2009.01)
*H04W 4/00* (2009.01)

(52) U.S. Cl.
CPC ........... *H04W 4/025* (2013.01); *H04W 4/008* (2013.01)

(58) Field of Classification Search
CPC ....... H04B 2001/3872; H04M 2201/40; G10L 25/90; G10L 15/08; G10L 17/00; G10L 25/87; G10L 13/027; G10L 15/00; G10L 15/22; G10L 15/265; G10L 17/26; G10L 25/03

USPC ...................... 455/404.1, 404.2, 456.1–457; 340/539.13, 988–996

See application file for complete search history.

(56) References Cited

U.S. PATENT DOCUMENTS

| | | | |
|---|---|---|---|
| 8,363,820 B1* | 1/2013 | Graham | H04M 1/6008 379/390.02 |
| 2009/0083038 A1* | 3/2009 | Imoto | H04M 1/72563 704/270 |
| 2016/0019886 A1* | 1/2016 | Hong | G06F 3/0414 704/231 |

FOREIGN PATENT DOCUMENTS

FR    2761800 A1 *   10/1998   ............. G10L 15/25

* cited by examiner

*Primary Examiner* — Ronald Eisner
(74) *Attorney, Agent, or Firm* — Reches Patents

(57) ABSTRACT

A method for detecting whispered speech of a user of a mobile computerized device, the method comprises: detecting, by the mobile computerized device, whispered speech context; and attempting to detect, by the mobile computerized device and by using whispered speech detection parameters, the whispered speech; and wherein at least one whispered speech detection parameter of the whispered speech detection parameters differs from at least one corresponding non-whispered speech parameter that is used for detecting non-whispered speech.

20 Claims, 4 Drawing Sheets

WHISPERED SPEECH DETECTION

RELATED APPLICATIONS

This application claims priority from U.S. provisional patent Ser. No. 62/170,212 filing date Jun. 3, 2015, which is incorporated herein by reference.

BACKGROUND OF THE INVENTION

Whispered speech differs from normal speech by having no periodic excitation or harmonic structure, has formant frequencies that are shifted higher than those of normal speech, has a spectral slope that is flatter than the spectral slope of normal speech, has a longer duration than normal speech and exhibits a lower energy level.

Due to these differences it is hard to detect whispered speech and usage of normal speech detection algorithms is inefficient.

There is a growing need to detect whispered speech.

SUMMARY

According to an embodiment of the invention there may be provided a method for detecting whispered speech of a user of a mobile computerized device, the method may include detecting, by the mobile computerized device, whispered speech context and attempting to detect, by the mobile computerized device and by using whispered speech detection parameters, the whispered speech and wherein at least one whispered speech detection parameter of the whispered speech detection parameters differs from at least one corresponding non-whispered speech parameter that is used for detecting non-whispered speech.

The detecting of the whispered speech context may include determining that the mobile computerized device is positioned at a location in which it is customary to whisper.

The detecting of the whispered speech context may include determining that the mobile computerized device is positioned at a location selected out of a group that consists of a theatre, a cemetery and a library.

The detecting of the whispered speech context is responsive to a location of the mobile computerized device.

The method may include determining the location of the mobile computerized device based on short range transmitted content received by the mobile computerized device.

The short range transmitted content received by the mobile computerized device is a targeted advertisement that has a local distribution.

The method may include determining the location of the mobile computerized device based on one or more locations sensors of the mobile computerized device.

The detecting of the whispered speech context is not based on speech analysis.

The detecting of the whispered speech context is responsive to a spatial relationship between the mobile computerized device and a mouth of the user.

The detecting of the whispered speech context may include acquiring one or more images of the user and processing the one or more images of the user to detect the whispered speech context.

The processing may include evaluating whether the user partially shields a mouth of the user with one or more hands of the user.

The processing may include evaluating whether the user places a mouth of the user within few centimeters from the whispered speech context.

The detecting of the whispered speech context comprises evaluating whether a mouth of the user is within few centimeters from.

The method may include updating one or more whispered speech detection parameter of the whispered speech detection parameters based on an outcome of the attempting to detect whispered speech.

The attempting to detect the whispered speech may include applying a whispered speech trigger detection process for detecting a whispered speech trigger and wherein a detecting of the whispered speech trigger is followed by applying a whispered speech recognition process for detecting the whispered speech; and wherein the whispered speech recognition process differs from the whispered speech trigger detection process.

The whispered speech trigger detection process is associated with a power consumption that is lower than a power consumption associated with the applying of the speech recognition process.

The applying of the whispered speech trigger detection process comprises searching for a predefined whispered speech content.

The applying of the whispered speech trigger detection process comprises searching for a predefined spectral signature.

According to an embodiment of the invention there may be provided a non-transitory computer readable medium that stores instructions that once executed by a mobile computerized device cause the mobile computerized device to detect whispered speech of a user of a mobile computerized device by detecting, by the mobile computerized device, whispered speech context and attempting to detect, by the mobile computerized device and by using whispered speech detection parameters, the whispered speech and wherein at least one whispered speech detection parameter of the whispered speech detection parameters differs from at least one corresponding non-whispered speech parameter that is used for detecting non-whispered speech.

According to an embodiment of the invention there may be provided a mobile computerized device that may include one or more sensors, a microphone, a processor; wherein the processor is configured to detect whispered speech context and to attempt to detect, by using whispered speech detection parameters, whispered speech of the user that is sensed by the microphone; wherein at least one whispered speech detection parameter of the whispered speech detection parameters differs from at least one corresponding non-whispered speech parameter that is used for detecting non-whispered speech.

According to an embodiment of the invention there may be provided a method for detecting whispered speech and non-whispered speech of a user of a mobile computerized device, the method may include attempting to detect, by the mobile computerized device, a whispered speech trigger and a normal speech trigger; when detecting the whispered speech trigger then applying a whispered speech recognition process that uses whispered speech detection parameters for detecting the whispered speech; and when detecting the non-whispered speech trigger then applying a non-whispered speech recognition process that uses non-whispered speech detection parameters for detecting the non-whispered speech; wherein at least one whispered speech detection parameter of the whispered speech detection parameters differs from at least one corresponding non-whispered speech parameter of the non-whispered speech parameters.

The attempting to detect the whispered speech trigger and the normal speech trigger may include attempting to detect whispered speech context.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
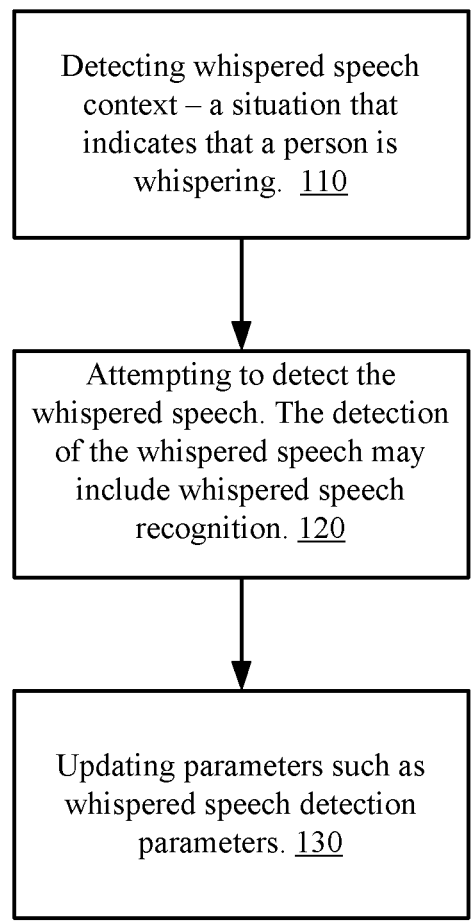
FIG. 1 illustrates a method according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

According to an embodiment of the invention there is provided a device and method for detecting whispered speech.

FIG. 1 illustrates method 100 according to an embodiment of the invention.

Method 100 starts by step 110 of detecting whispered speech context—a situation that indicates that a person is whispering. The detection is based upon one or more sensors of a mobile computerized device and conveniently not based upon speech analysis.

The mobile computerized device may be a mobile phone, a smartphone, a personal data assistant, a media player, a streamer, or any other computerized system. The mobile computerized device may include a hardware communication interface for short and/or long range communication. Short range being a range, for example, of less than about 20 meters.

The detection of whispered speech context may utilize one or more sensors such as a location sensor, a mobile computerized device accelerometer, a mobile computerized device gyroscope, a proximity sensor for sensing a distance between a user and the mobile computerized device, a light sensor, a vibration sensor a camera, a microphone, context awareness devices and the like.

For example, each one of the following detected situations (or a combination of any one of these detected situations) may be considered as detecting whispered speech content:

a. A user of the mobile computerized device inputs audio content while being in a theatre, a library, a cemetery or any other location in which it is customary to whisper. The detection may be based upon the location of the mobile computerized device and/or by short range transmitted content (such as targeted advertisements or information that has local distribution).

b. A user of the mobile computerized device places his mouth very near (few centimeters) to the mobile computerized device (especially very near to the microphone of the mobile computerized device). This can be sensed by a proximity sensor and/or by a vibration sensor and/or by one or more images acquired by the camera. The orientation of the mobile computerized device may also indicate that the mobile computerized device is in what can be regarded as a "talk to" position. This detected situation may not be conclusive (may also represent normal speech) and may be used in addition to one or more other detected situations.

c. A user of the device partially shields his mouth with his hands—which may be detected by one or more images acquired by the user.

d. A user of the device is in a meeting, classroom or other noisy environment (such as but not limited to noisy meeting places, noisy classrooms, and the like. This can be detected by a microphone.

Once detecting the whispered speech context the method proceeds to step 120 of attempting to detect the whispered speech. The detection of the whispered speech may include whispered speech recognition.

The detection of the whispered speech may be detected using whispered speech detection parameters that are tailored to the detection of whispered speech.

According to an embodiment of the invention the whispered speech detection parameters may differ than normal speech detection parameters so that whispered speech is detected only whispered speech detection parameters and normal speech is detecting using whispered speech detection parameters. It is noted that due to the substantial differences between whispered speech and normal speech it has been found that attempting to detect whispered speech using normal speech detection parameters may be inefficient and result in high false alarm and/or low detection rate.

Normal speech may be speech that is pronounced naturally without whispering, without shouting.

The whispered speech detection parameters may include, speech acoustic recognition parameters such as but not limited to at least one of the following:

Gaussian mixture parameters (GMM),
hidden Markov model parameters (HMM),
neural network parameters (NN),
deep neural network parameters (DNN), dynamic time warping parameters (DTW)
Detection thresholds
Parameters for feature vector generations like mel-frequency cepstrum coefficients (MFCC)
Parameters for speech processing: noise reduction, echo canceller, AGC etc. . . .

The whispered speech detection parameters can be fed to the mobile computerized device, can be learnt during one or more learning periods, can be updated over time (in view of more successes or failure to detect whispered speech) and the like. The whispered speech detection parameters may be sent to and/or generated by and/or sent from a remote computer that is located in the cloud environment.

A detection of a whispered speech may be followed by evaluating and even updating the whispered speech detection parameters.

The detection or lack of detection of whispered speech can result in updating one or more parameters of the mobile computerized device. These parameters may be noise reduction parameters (for example—allowing the noise reduction algorithm to distinguish between whispered speech and noise), updating echo cancellation parameters (for example—preventing an echo cancellation algorithm to clip whispered speech), updating automatic gain control (AGC) parameters (for example—for properly amplifying whispered speech), and/or updating speech vocoder parameters. For example—a noise reduction can think that whispered speech is noise and suppress it. So we can use it for detection, FIG. 1 includes step 130 of updating parameters such as whispered speech detection parameters.

According to an embodiment of the invention a whispered speech recognition process may be triggered only after a detection of a whispered speech trigger that may represent whispered speech. In this case the whispered speech recognition is executed by a whispered speech recognition circuit and/or whispered speech recognition process that consumes more power than a whispered speech trigger detection circuit and/or process. Thus, a detection of the whispered speech activate the whispered speech recognition circuit and/or whispered speech recognition process that is otherwise idle or in a low power mode.

It is noted that the whispered speech trigger detection circuit may be included in the mobile computerized device while the whispered speech recognition circuit may be located at another device (that communicates directly or indirectly with the mobile computerized device)—the other device may be mobile or not. For example—the other device may be a desktop computer, a server, a computer within a cloud computer environment. The other device may communicate with the mobile computerized device via one or more communication links such as short range communication links, long range communication links and the like.

The whispered speech trigger can be learnt during one or more learning periods, may be fed to the mobile computerized device or be learnt in any manner. The whispered speech trigger can be detected by finding one or more energy levels about one or more predefined thresholds in one or more predefined frequencies. The whispered trigger may be a predefined whispered word or speech content.

Figure 2:
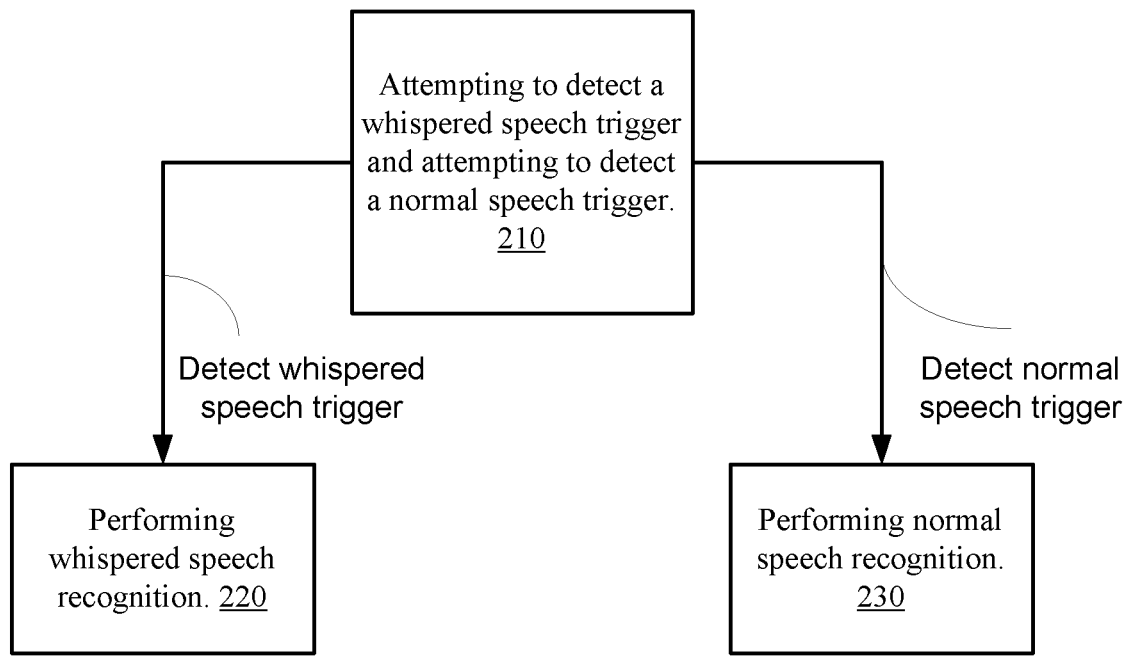
FIG. 2 illustrates a method according to an embodiment of the invention.

FIG. 2 illustrates method 200 according to an embodiment of the invention.

Method 200 starts by step 210 of attempting to detect a whispered speech trigger and attempting to detect a normal speech trigger.

Each one of the whispered speech trigger and the normal speech trigger can be learnt during one or more learning periods, may be fed to the mobile computerized device or be learnt in any manner. The whispered speech trigger can be detected by finding one or more energy levels about one or more predefined thresholds in one or more predefined frequencies. The whispered trigger and/or the normal speech trigger may be a predefined whispered word or speech content.

Each one of the whispered speech trigger and the normal speech trigger can be a fixed which is a predefined voice trigger and a common acoustic model where each user can talk or an enrolled fixed trigger—a user enrolls/train the system by telling the trigger word. This can include voice authentication.

The whispered speech trigger detection circuit and/or the normal speech trigger detection circuit may include filters and power sensors for sensing the power in certain frequency ranges and detecting the trigger when the power exceeds a predefined level. Alternatively—the whispered speech trigger detection circuit and/or the normal speech trigger detection circuit may search for any signature of the whispered trigger and the normal trigger. By searching for a predefined trigger the circuit is compact.

The normal speech trigger and/or the whispered speech trigger may be a predefined word, phrase and/or sound and may be detected by using much less computational resources than the full scale speech recognition.

According to an embodiment of the invention step 210 may include detecting a trigger (for example detecting at least one or more predefined power levels at one or more predefined frequency bands)—and the differentiating between whispered speech trigger and normal speech trigger by context—if detecting whispered speech context (see method 100) then determining that a whispered speech trigger was detected—else determining that a normal speech trigger was detected.

If no trigger is found step 210 is followed by itself.

If a whispered speech trigger is detected than step 210 may be followed by step 220 of performing whispered speech recognition.

Step 220 may include configuring a configurable speech recognition circuit and/or process to recognize whispered speech by feeding it with whispered speech recognition parameters.

Step 220 may include activating a dedicated whispered speech recognition circuit and/or process.

If a normal speech trigger is detected than step 210 may be followed by step 230 of performing normal speech recognition.

Step 230 may include configuring a configurable speech recognition circuit and/or process to recognize normal speech by feeding it with normal speech recognition parameters.

Step 230 may include activating a dedicated normal speech recognition circuit and/or process.

Steps 220 and 230 may use any known whispered speech and normal speech recognition process. A non-limiting example for normal speech detection and for whispered speech detection is illustrated in US patent application serial number 2006/0085183 of Jain which is incorporated herein by reference. Yet another example is provided in "Speaker Identification Within Whispered Speech Audio Streams", Xian Fan John H L Hansen, IEEE Transactions on Audio, Speech, and Language Processing (Volume: 19, Issue: 5), pages 1408-1821, Dec. 19, 2010.

The whispered speech detection parameters may include, speech acoustic recognition parameters such as but not limited to at least one of the following:

Gaussian mixture parameters (GMM),
hidden markov model parameters (HMM),
neural network parameters (NN),
deep neural network parameters (DNN),
dynamic time warping parameters (DTW)
Detection thresholds
Parameters for feature vector generations like mel-frequency cepstrum coefficients (MFCC)
Parameters for speech processing: noise reduction, echo canceller, AGC etc. . . .

It is noted that the whispered speech trigger detection circuit (for executing step 220) and/or the normal speech trigger detection circuit (for executing step 230) may be included in the mobile computerized device while the whispered speech recognition circuit and/or the normal speech detection circuit may be located at another device (that communicates directly or indirectly with the mobile computerized device)—the other device may be mobile or not. For example—the other device may be a desktop computer, a server, a computer within a cloud computer environment. The other device may communicate with the mobile computerized device via one or more communication links such as short range communication links, long range communication links and the like.

Figure 3:
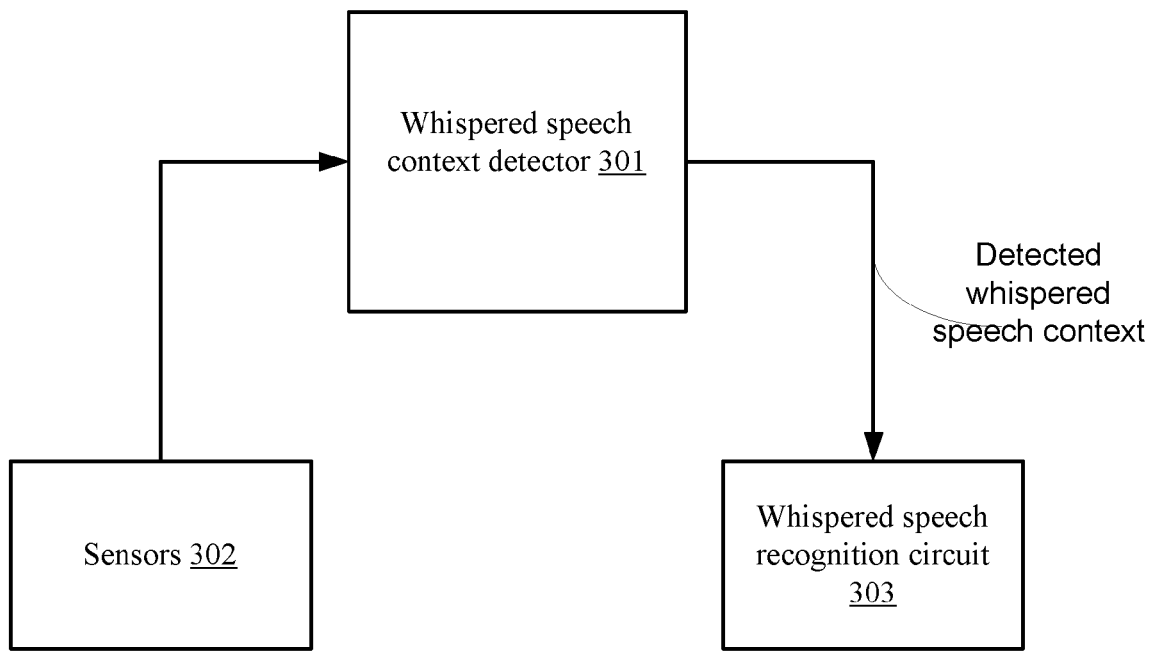
FIG. 3 illustrates a mobile computerized device according to an embodiment of the invention.

FIG. 3 illustrates mobile computerized device 300 according to an embodiment of the invention.

Mobile computerized device 300 includes a whispered speech context detector 301 that is fed by one or more sensors 302, and a whispered speech recognition circuit 303. The one or more sensors 302 may be a location sensor, a mobile computerized device accelerometer, a mobile computerized device gyroscope, a proximity sensor for sensing a distance between a user and the mobile computerized device, a light sensor, a vibration sensor, a camera, a microphone, and the like. The whispered speech content detector 301 may be a hardware processor that executed a program that may execute method 100. The mobile computerized device 300 may be a mobile phone, a smartphone, a personal data assistant, a media player, a streamer, or any other computerized system.

Figure 4:
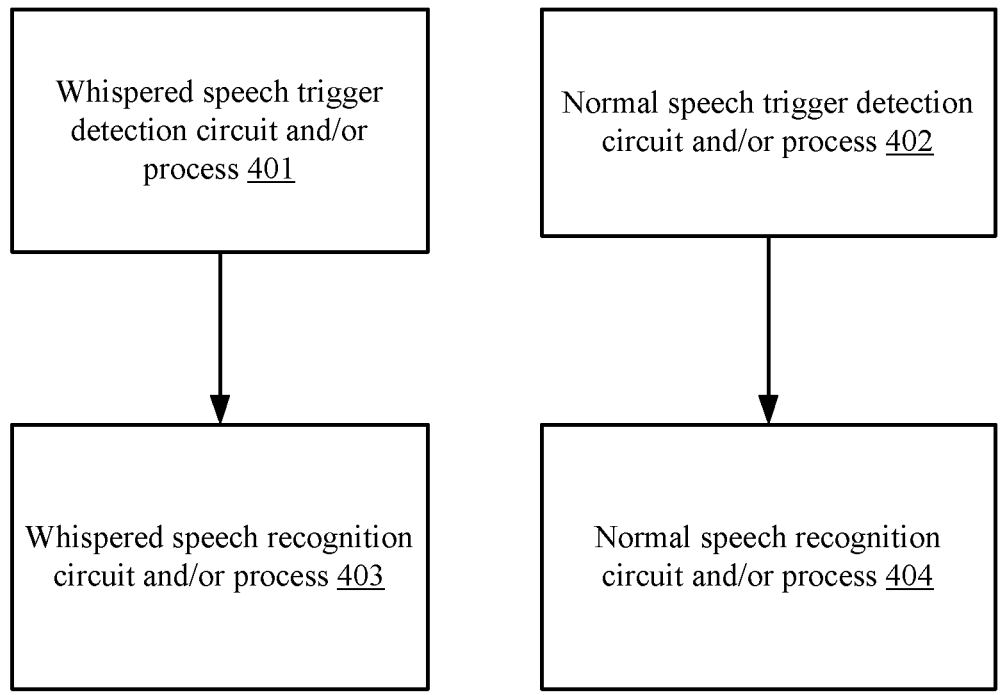
FIG. 4 illustrates a mobile computerized device according to an embodiment of the invention.

FIG. 4 illustrates a mobile computerized device 400 according to an embodiment of the invention.

Mobile computerized device 400 may include (a) a whispered speech trigger detection circuit and/or process 401, (b) a normal speech trigger detection circuit and/or process 402, (c) whispered speech recognition circuit and/or process 403 and (d) a normal speech recognition circuit and/or process 404.

Each one of circuits 401, 402, 403 and 404 may be a hardware processor, may be hosted by a hardware processor, may be a hardware accelerator.

The mobile computerized device may include a configurable speech recognition circuit that may recognize normal speech when fed with normal speech detection parameters and may recognize normal speech when fed with normal speech detection parameters.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for detecting whispered speech of a user of a mobile computerized device, the method comprises:
   detecting, by the mobile computerized device, whispered speech context; and attempting to detect, by the mobile computerized device and by using whispered speech detection parameters, the whispered speech;

wherein at least one whispered speech detection parameter of the whispered speech detection parameters differs from at least one corresponding non-whispered speech parameter that is used for detecting non-whispered speech;

wherein the attempting to detect the whispered speech comprises: applying a whispered speech trigger detection process for detecting a whispered speech trigger;

wherein a detecting of the whispered speech trigger is followed by applying a whispered speech recognition process for detecting the whispered speech;

wherein the whispered speech recognition process differs from the whispered speech trigger detection process; and wherein the whispered speech trigger detection process is associated with a power consumption that is lower than a power consumption associated with the applying of the speech recognition process.

2. The method according to claim 1, wherein the detecting of the whispered speech context comprises determining that the mobile computerized device is positioned at a location in which it is customary to whisper.

3. A method for detecting whispered speech of a user of a mobile computerized device, the method comprises: detecting, by the mobile computerized device, whispered speech context; and attempting to detect, by the mobile computerized device and by using whispered speech detection parameters, the whispered speech; wherein at least one whispered speech detection parameter of the whispered speech detection parameters differs from at least one corresponding non-whispered speech parameter that is used for detecting non-whispered speech;

wherein the detecting of the whispered speech context comprises determining that the mobile computerized device is positioned at a location selected out of a group that consists of a theatre, a cemetery and a library.

4. The method according to claim 1, wherein the detecting of the whispered speech context is responsive to a location of the mobile computerized device.

5. The method according to claim 4, wherein the method comprises determining the location of the mobile computerized device based on short range transmitted content received by the mobile computerized device.

6. A method for detecting whispered speech of a user of a mobile computerized device, the method comprises: detecting, by the mobile computerized device, whispered speech context; and attempting to detect, by the mobile computerized device and by using whispered speech detection parameters, the whispered speech; wherein at least one whispered speech detection parameter of the whispered speech detection parameters differs from at least one corresponding non-whispered speech parameter that is used for detecting non-whispered speech;

wherein the detecting of the whispered speech context is responsive to a location of the mobile computerized device;

wherein the method comprises determining the location of the mobile computerized device based on short range transmitted content received by the mobile computerized device; and wherein the short range transmitted content received by the mobile computerized device is a targeted advertisement that has a local distribution.

7. The method according to claim 4, wherein the method comprises determining the location of the mobile computerized device based on one or more locations sensors of the mobile computerized device.

8. The method according to claim 6, wherein the detecting of the whispered speech context is not based on speech analysis.

9. The method according to claim 1, wherein the detecting of the whispered speech context is responsive to a spatial relationship between the mobile computerized device and a mouth of the user.

10. The method according to claim 1, wherein the detecting of the whispered speech context comprises acquiring one or more images of the user and processing the one or more images of the user to detect the whispered speech context.

11. The method according to claim 10, wherein the processing comprises evaluating whether the user partially shields a mouth of the user with one or more hands of the user.

12. The method according to claim 10, wherein the processing comprises evaluating whether the user places a mouth of the user within few centimeters from the whispered speech context.

13. The method according to claim 1, wherein the detecting of the whispered speech context comprises evaluating whether a mouth of the user is within few centimeters from.

14. The method according to claim 1, comprising updating one or more whispered speech detection parameter of the whispered speech detection parameters based on an outcome of the attempting to detect whispered speech.

15. The method according to claim 6, wherein the attempting to detect the whispered speech comprises: applying a whispered speech trigger detection process for detecting a whispered speech trigger; and wherein a detecting of the whispered speech trigger is followed by applying a whispered speech recognition process for detecting the whispered speech; and wherein the whispered speech recognition process differs from the whispered speech trigger detection process.

16. The method according to claim 1, wherein the whispered speech trigger detection process is associated with a power consumption that is lower than a power consumption associated with the applying of the speech recognition process.

17. The method according to claim 1, wherein the applying of the whispered speech trigger detection process comprises searching for a predefined whispered speech content.

18. The method according to claim 1, wherein the applying of the whispered speech trigger detection process comprises searching for a predefined spectral signature.

19. A non-transitory computer readable medium that stores instructions that once executed by a mobile computerized device cause the mobile computerized device to detect whispered speech of a user of a mobile computerized device by: detecting, by the mobile computerized device, whispered speech context; and attempting to detect, by the mobile computerized device and by using whispered speech detection parameters, the whispered speech; and wherein at least one whispered speech detection parameter of the whispered speech detection parameters differs from at least one corresponding non-whispered speech parameter that is used for detecting non-whispered speech; wherein the attempting to detect the whispered speech comprises: applying a whispered speech trigger detection process for detecting a whispered speech trigger; wherein a detecting of the whispered speech trigger is followed by applying a whispered speech recognition process for detecting the whispered speech; wherein the whispered speech recognition process differs from the whispered speech trigger detection process; and wherein the whispered speech trigger detection process is associated with a power consumption that is lower than a power consumption associated with the applying of the speech recognition process.

20. A mobile computerized device that comprises one or more sensors, a microphone, a processor; wherein the processor is configured to detect whispered speech context and to attempt to detect, by using whispered speech detection parameters, whispered speech of the user that is sensed by the microphone; wherein at least one whispered speech detection parameter of the whispered speech detection parameters differs from at least one corresponding non-whispered speech parameter that is used for detecting non-whispered speech; wherein processor is configured to attempt to detect the whispered speech by applying a whispered speech trigger detection process for detecting a whispered speech trigger; wherein the processor is configured to apply, following a detection of the whispered speech trigger, a whispered speech recognition process for detecting the whispered speech; wherein the whispered speech recognition process differs from the whispered speech trigger detection process; and wherein the whispered speech trigger detection process is associated with a power consumption that is lower than a power consumption associated with the applying of the speech recognition process.

* * * * *